//  (12) United States Patent
Newton et al.

(10) Patent No.: US 8,606,076 B2
(45) Date of Patent: Dec. 10, 2013

(54) 3D VIDEO REPRODUCTION MATCHING THE OUTPUT FORMAT TO THE 3D PROCESSING ABILITY OF A DISPLAY

(75) Inventors: Philip S. Newton, Eindhoven (NL); Francesco Scalori, Eindhoven (CH); Gerardus W. T. Van Der Heijden, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 78 days.

(21) Appl. No.: 13/127,801

(22) PCT Filed: Nov. 18, 2009

(86) PCT No.: PCT/IB2009/055149
§ 371 (c)(1),
(2), (4) Date: May 5, 2011

(87) PCT Pub. No.: WO2010/058354
PCT Pub. Date: May 27, 2010

(65) Prior Publication Data
US 2011/0211806 A1   Sep. 1, 2011

(30) Foreign Application Priority Data

Nov. 24, 2008  (EP) .................................... 08169775

(51) Int. Cl.
| H04N 9/80 | (2006.01) |
| H04N 5/262 | (2006.01) |
| H04N 5/775 | (2006.01) |
| H04N 9/47 | (2006.01) |
| H04N 11/20 | (2006.01) |
| H04N 13/00 | (2006.01) |
| G06F 3/038 | (2013.01) |
| G06F 17/30 | (2006.01) |
| G06K 9/36 | (2006.01) |

(52) U.S. Cl.
USPC ............. 386/241; 386/230; 345/213; 348/42; 348/43; 348/53; 348/239; 348/441; 382/232; 382/236; 382/240; 382/243; 707/828

(58) Field of Classification Search
USPC ......... 386/230, 241, E5.001, E5.002; 345/77, 345/213; 348/42, 43, 53, 222.1, 239, 441, 348/E7.003, E7.039, E13.001, E13.002, 348/E13.06, E13.075; 358/909.1; 382/232, 382/236, 240, 243; 702/82; 707/828, 707/E17.01
See application file for complete search history.

(56) References Cited

U.S. PATENT DOCUMENTS 4,266,240 A * 5/1981 Levy ............................... 348/43
5,285,197 A * 2/1994 Schmidt et al. ............... 345/213
(Continued)

FOREIGN PATENT DOCUMENTS

| AU | 738692 B2 | 6/1999 |
| EP | 1677533 A2 | 5/2006 |
| WO | WO2006137000 A1 | 12/2006 |
| WO | WO2007072289 A2 | 6/2007 |
| WO | WO2008038205 A2 | 4/2008 |
| WO | WO2008053401 A1 | 5/2008 |

*Primary Examiner* — Gelek W Topgyal
*Assistant Examiner* — Syed Hasan
(74) *Attorney, Agent, or Firm* — Larry Liberchuk

(57) ABSTRACT

A method of transmitting three dimensional video information over an interface from a playback device to a displaying device, the displaying device and the interface such that the properties of the displaying device can be queried over the interface, the method comprising determining one or more video format in which a compressed three dimensional video information is available to an input of the playback device, the three dimensional video information available either as stored on a record medium or received via a data transmission system; querying the displaying device over the interface with respect to one or more three dimensional video formats which the displaying device is able to process; selecting a best matching video format, wherein the best matching video format different from at least one available video format, the selection of the best matching video format based on the available video format and the video formats which the displaying device is able to process; processing the compressed three dimensional video information such that the three dimensional video information is transmitted over the interface in the best matching video format.

12 Claims, 7 Drawing Sheets

HAVi device configuration 1920 x 1080.

(56) References Cited

U.S. PATENT DOCUMENTS

| | | | |
|---|---|---|---|
| 5,786,851 A * | 7/1998 | Kondo et al. | 348/222.1 |
| 6,813,388 B2 * | 11/2004 | Kadono | 382/243 |
| 2004/0075763 A1 * | 4/2004 | Tognoni | 348/441 |
| 2004/0222951 A1 * | 11/2004 | Lee et al. | 345/77 |
| 2005/0117637 A1 | 6/2005 | Routhier | |
| 2005/0288881 A1 * | 12/2005 | Hori | 702/82 |
| 2006/0062490 A1 | 3/2006 | Ha | |
| 2008/0225180 A1 | 9/2008 | Callway | |
| 2010/0046917 A1 * | 2/2010 | Naranjo | 386/95 |
| 2010/0208042 A1 * | 8/2010 | Ikeda et al. | 348/53 |

* cited by examiner

HAVi device configuration 1920 x 1080.

High-level block diagram of the format/method selection algorithm.

Dealing with stereo content.

Dealing with stereo content.

Register 29 extended to indicate video output format

Example formats of video background.

Possible HAVi device configuration

3D VIDEO REPRODUCTION MATCHING THE OUTPUT FORMAT TO THE 3D PROCESSING ABILITY OF A DISPLAY

FIELD OF THE INVENTION

This application relates to a method of transmitting three dimensional video information over an interface from a playback device to a displaying device and a device for playback of three dimensional video information implementing the method.

BACKGROUND OF THE INVENTION

With the introduction of new 3D displays, there is an opportunity for 3D video to break through to the mass consumer market. Such 3D displays are able to handle both 3D display and 2D display. Presently, many displaying devices exist that can create a 3D audiovisual experience. These expect different input formats and have different capabilities in terms of resolution, colour depth, frequency, etc.

It is expected that 3D video content is sent from a player devices to a display over standard interface. It is known that 3D video content requires a much higher bandwidth for an interface, hence various transmission methods have been designed that allow sending the additional 3D data without exceeding the limits of existing interface standards. Some of these methods work better with some display types and are not possible with others.

Next to display-type developments, a lot of research has been carried out on developing how to express and describe 3D content, going beyond nowadays mainly two-dimensional content. This resulted in many 3D formats belonging to two main categories: depth-based and stereo or multi-view formats. Each of these categories has further sub-formats, for example the 2D video+depth map may be extended by adding occlusion and transparency information, or stereo+depth may be used as input format. Alternatively the multiple views may be used as input signal and mapped directly onto the display (sub) pixels. A flexible format for 3D video content has been disclosed in 2006/137000-A1 by the same applicant, to be included herein by reference.

Hence there are available several types of display devices, each with its own 3D display abilities, and several methods of transmitting 3D information from a playback device to a display device, and several possible formats for compressing 3D information, many of these incompatible with each other.

The available of many 3D devices and 3D formats that are incompatible with each other (in other word the lack of a unified standard) may make 3D displays and 3D players less attractive to a consumer and risk to lead to limited market acceptance.

SUMMARY OF THE INVENTION

It is an object of the invention to provide a method of transmitting three dimensional video information over an interface from a playback device to a displaying device alleviating at least one of the above mentioned drawbacks and risks. The invention is based on the insight the playback device is positioned in the transmission chain such that it may have information both on the compressed 3D information to be processed and the 3D capabilities of the displaying device. Hence the playback device, if adapted so that it can match the 3D compressed video information and the 3D display capabilities, it can obviate compatibility problems.

The method according to the invention comprises determining one or more video format in which a compressed three dimensional video information is available to an input of the playback device, the three dimensional video information available either as stored on a record medium or received via a data transmission system; querying the displaying device over the interface with respect to one or more three dimensional video formats which the displaying device is able to process; selecting a best matching video format, the best matching video format different from at least one available video format, the selection of the best matching video format based on the available video format and the video formats which the displaying device is able to process; processing the compressed three dimensional video information such that the three dimensional video information is transmitted over the interface in the best matching video format. Hence the input 3D video information is processed such that a signal matching the display capabilities of the displaying device, such that compatibility problems are alleviated.

Advantageous embodiments of the invention are presented in the dependent claims.

Display types and formats are closely related and each display type is intrinsically built to support a specific number of formats, justifying the grouping of the many existing display technologies into the same two categories of depth-based and stereo.

Playback and display devices are connected through a standardized interface which enables sending video and audio, as well as exchange of control information, from player to display. The vast majority of interconnections are established using the standard High-Definition Multimedia Interface (HDMI) which is intended to carry two-dimensional content, and the same holds for all other existing interface types.

As carrying 3D content requires sending a larger amount of data, in order to enable that on existing interfaces in a backwards-compatible way and not exceeding the interface limits, various methods have been designed to exploit various features of the standard to carry the additional information necessary to turn the rendering experience three-dimensional.

Given a specific format there are in general various methods that are suitable to support that format, and the more demanding the format (in terms of resolution, frame rate, etc.), the smaller number of suitable methods.

A selection of the most important methods is presented in the Table 1.

TABLE 1

3D content transmission methods.

|  | Depth-based formats | Stereo formats | Sacrificed feature |
|---|---|---|---|
| Audio channel Error! Reference source not found. | x |  | audio |
| Colour depth | x | x | colour depth |
| Column- or Line-interleaved | x | x | resolution |
| Time-sequential |  | x | frame rate |
| Side-by-Side |  | x | resolution |

Audio channel refers to an method described in International application IB2008/053401 that suggests how to carry a depth-map within HDMI audio packets, providing also a mechanism to synchronize it with the video.

Alternatively if the number of bits per pixel of the content is small enough, the number of bits per pixel that can be sent through the interface can be divided and partly used to carry the video and the remainder to carry depth or a second view.

The line-interleaved method specifies instead to select the even lines for the video and the odd lines for the depth or the right view.

Another option is meant for stereo and consists in exploiting the interface bandwidth over time and sending left and right view one after the other. Many other options exists each with different trade-offs.

With such a large variety in formats a problem that occurs is how to support all the different types of displays that require different 3D video formats as input. Some standardization on video formats has been done for stereo video in the VESA Display Information Extension Block standard (DI-EXT). This standard describes fields in description information set (E-EDID information) that a display may send to a playback device such that it can determine the best video format for transmission over the video interface such as HDMI. The table below shows the formats supported:

TABLE 2

Section of table 3.4.1 Miscellaneous display Capabilities of the VESA DI-Ext standard.

| Stereo Video {Bits 6 => 4} | Bits 6 => 4: Stereo Video<br>'000' --- No direct stereo<br>'001' --- Field seq. stereo via stereo sync signal<br>'010' --- auto-stereoscopic, column interleave<br>'011' --- auto-stereoscopic, line interleave<br>'100' => '111' --- Reserved (Do Not Use) |
|---|---|

However this standard has not been implemented in most 3D displays on the market and also even this standard already defines three independent formats. The main problem is how can a playback device, for example a Blu-ray Disc Player or a set top box, that is capable of processing 3D video and graphics determine how to correctly composite the video and graphics overlay on its output such that it meets the format required by a 3D display.

In order to avoid that playback devices will work only with some displays and not with the others, a playback device according to the invention can change the composition of video and graphics to meet the output format as required by the display.

Various display types have been invented which, connected to a playback device (e.g. Blu-Ray Disc player, set-top box) over a standard interface, can deliver a three-dimensional experience to consumers in their living room.

This invention proposes a solution that enables different 3D formats to co-exist, allowing playback and display devices to communicate with each other and the playback device to select a format and a corresponding method supported by both and suitable for the selected interface constraints, to be used to send three-dimensional content.

In the following additional advantageous embodiments of the invention are describes. For simplicity, a specific interface standard is utilized—typically HDMI—however this is an exemplary choice that can be easily ported to other interface choices.

Display devices are currently capable of holding specific information about its capabilities (e.g. dimensions, aspect ratio) (E-EDID information), which can be accessed by playback devices and taken into account during content transmission. According to an embodiment of the invention, this can be extended to include a new table listing the supported 3D formats.

According to an embodiment of the invention, playback devices are instructed to parse that additional information and discover which formats are supported by displays.

According to an embodiment of the invention, An algorithm is implemented on the playback device that identifies the best match between the formats supported by the display and by itself, and as a second step picks the best method to carry the 3D content in the selected format to the display, in a way that does not exceed the interface limitations. The algorithm refers to the known methods of carrying 3D additional information over existing interfaces, but new methods based on different principles can be included as well.

According to a further embodiment of the invention, during content transmission, pieces of information are embedded in the data to inform the display of the format and the method used to send the content, allowing the display to know how to interpret the received data and possibly also to pre-configure itself for best rendering.

According to a further embodiment of the invention, the playback device, once it has determined the best transmission format, stores identification information in a register such that applications either on storage or coming over a broadcast channel (such as the Internet, Cable, Satellite) can read the register value and accordingly change the way they composite video and graphics overlay on the player devices output. In this way the application on disc can create the output format that is most suitable for the attached 3D display.

According to a further embodiment of the invention, specifically for player device enabled to read 3D content from Blu-ray Discs, it is provided a Player Settings Register and a Java Application Programmer interface such that BD-Java Applications can access the register information and change the compositing of video and graphics overlay.

In an alternative embodiment of the invention the player automatically changes the HAVi device configuration to match the underlying video format composition. The HAVi device configuration is intended to allow the application from storage to control the configuration of the video and graphics planes in the system. A typical example configuration is shown in FIG. 1. Through changing this configuration the application can control how the graphics drawn by the application are composited over the video before it is sent out to the display. More info on the HAVI device configuration may also be obtained from http://www.havi.org/technical/specifications.asp (freely accessible).

BRIEF DESCRIPTION OF THE DRAWINGS

The features and advantages of the invention will be further explained upon reference to the following drawings, in which.

DETAILED DESCRIPTION OF THE PREFERRED EMBODIMENTS

Figure 1:
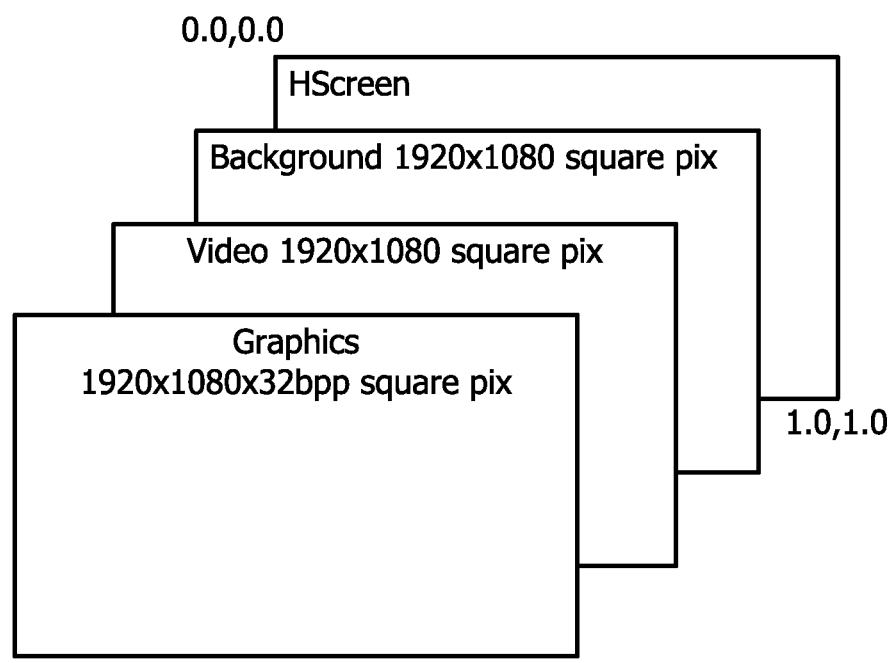
FIG. 1, illustrates HAVi device configuration.

The core of the invention is a method of transmitting three dimensional video information over an interface from a playback device to a displaying device, the displaying device and the interface such that the properties of the displaying device can be queried over the interface, the method comprising determining one or more video format in which a compressed three dimensional video information is available to an input of the playback device, the three dimensional video information available either as stored on a record medium or received via a data transmission system;

querying the displaying device over the interface with respect to one or more three dimensional video formats which the displaying device is able to process;

selecting a best matching video format, wherein the best matching video format different from at least one available video format, the selection of the best matching video format based on the available video format and the video formats which the displaying device is able to process processing the compressed three dimensional video information such that the three dimensional video information is transmitted over the interface in the best matching video format.

The method, is implemented on the playback device that identifies the best match between the formats supported by the display and by itself, and picks the best method to carry the 3D content in the selected format to the display, in a way that does not exceed the interface limitations.

For simplicity, a specific interface standard is utilized—typically HDMI—however this is an exemplary choice that can be easily ported to other interface choices. HDMI is currently the most important standard utilized to connect playback devices and digital TVs and carries video as well as audio and control information. HDMI specifies that all display devices must contain a CEA-861-D compliant E-EDID data structure, comprising at least two parts, the first 128 bytes representing an EDID 1.3 structure and, as a first E-EDID extension, a CEA Extension version 3. Next to those, other CEA E-EDID extensions can follow, one of which is extended with one or more values from Table 3 (as an example only a subset of the formats allowed within HDMI are shown).

TABLE 3

3D formats.

| 3D format | Resolution | Frame rate | Bits per pixel | Value |
|---|---|---|---|---|
| Stereo | 720 × 480 | p@60 | 32 | 0 |
| Stereo | 720 × 480 | i@240 | 24 | 1 |
| Stereo | 1920 × 1080 | i@25 | 24 | 2 |
| Stereo | 1920 × 1080 | p@25 | 24 | 3 |
| Stereo | 1920 × 1080 | i@60 | 32 | 4 |
| Stereo | 1920 × 1080 | p@60 | 24 | 5 |
| Stereo | 1920 × 1080 | i@120 | 24 | 6 |
| Depth-based | 720 × 480 | p@60 | 32 | 7 |
| Depth-based | 720 × 480 | p@240 | 24 | 8 |
| Depth-based | 1920 × 1080 | i@25 | 24 | 9 |
| Depth-based | 1920 × 1080 | p@25 | 24 | 10 |
| Depth-based | 1920 × 1080 | i@60 | 32 | 11 |
| Depth-based | 1920 × 1080 | p@60 | 24 | 12 |
| Depth-based | 1920 × 1080 | i@120 | 24 | 13 |

Using the Display Data Channel, the playback device then reads the relevant information about the display capabilities and decides in which format and using which method it will send the content. This decision is taken according to the display capabilities and some content-related information, performing at least one of the following steps.

Querying the displaying device over the interface with respect to one or more three dimensional video formats which the displaying device is able to process, as shown in Table 3.

In the preferred embodiment, it is assumed that, if the list contains more than one item, each display has a favourite format, corresponding to the one with higher resolution and frame rate.

Based on that information, the actual format in which the content is stored is considered and "matched" with the display supported format. This can result in different actions for different embodiments. Scaling can occur if for example the content resolution is smaller (up-scaling) or greater (down-scaling) than that of the supported resolution. Similar adaptation is enabled that concerns frame rate or colour depth. As a result of this a single format is selected and considered in the next steps.

In an advantageous embodiment, If the selected format is stereo, then read the maximum horizontal and vertical frequency reachable by the display (also present in the EDID). If that is high enough to accommodate the content, according to its resolution and frame rate, then choose the time-sequential method.

In an advantageous embodiment, If the maximum display frequency is already exploited by the content frame rate, and if the content colour depth is less than or equal to half of the maximum display colour depth, then pick the colour depth method. Alternatively if the content resolution is small enough, choose the line-interleaved method of carrying left and right view in the same active frame.

In an advantageous embodiment, If the selected format is depth-based, perform similar evaluations and check if colour depth or line-interleaved method can be used.

Alternatively, if the content includes only a stereo audio channel or the playback device is not connected to a full surround sound system, then accommodate the depth in HDMI audio packets.

In an advantageous embodiment, If no method is able to send the content in the selected format without exceeding HDMI limits, choose next supported format (i.e. the one with immediate lower resolution and frame rate than that of the selected one) and repeat from step 0.

Figure 2:
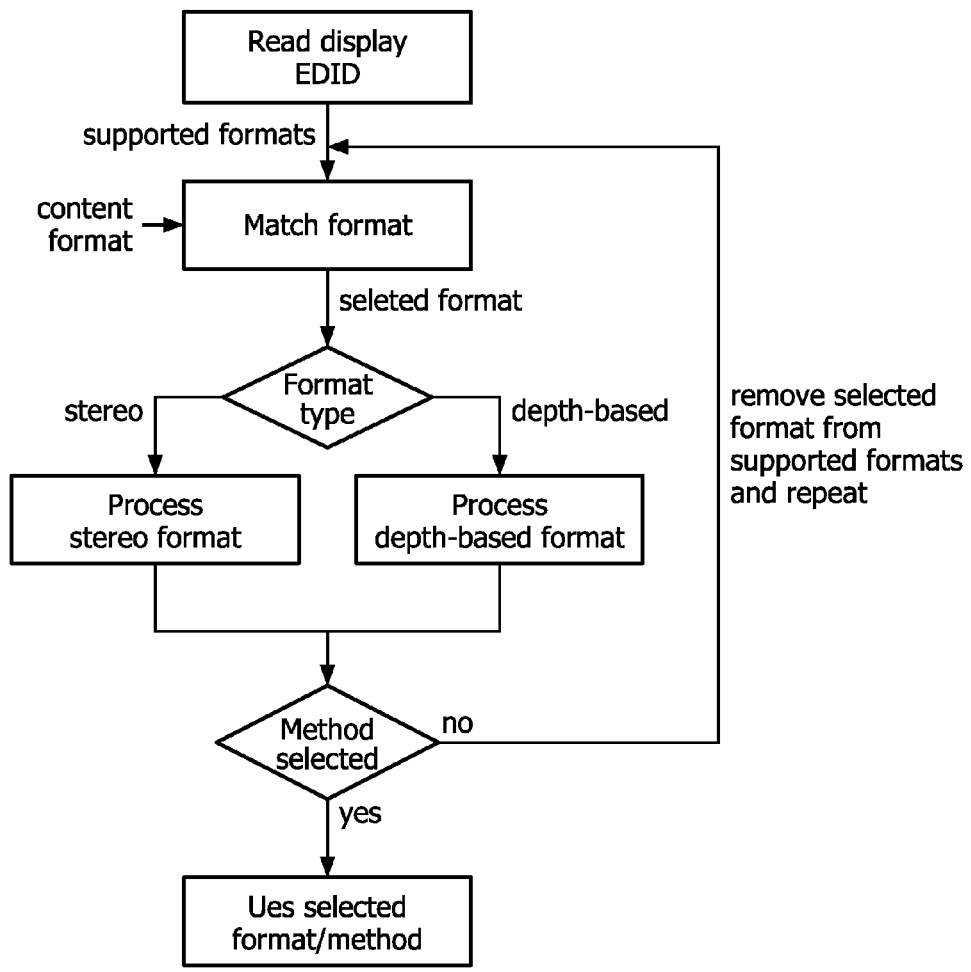
FIG. 2, illustrates a high-level block diagram of the format/method selection algorithm.
Figure 3:
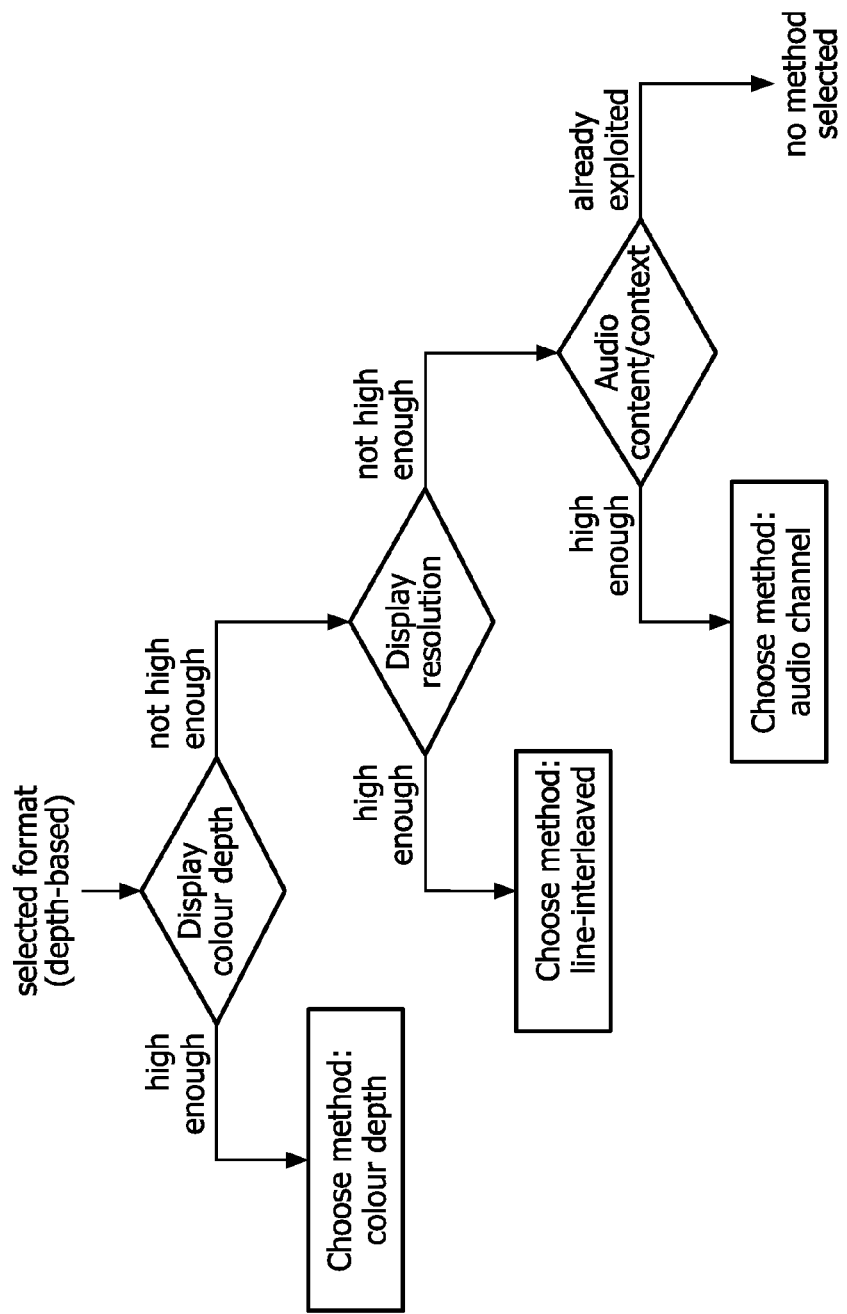
FIG. 3. illustrates how to deal with stereo content.
Figure 4:
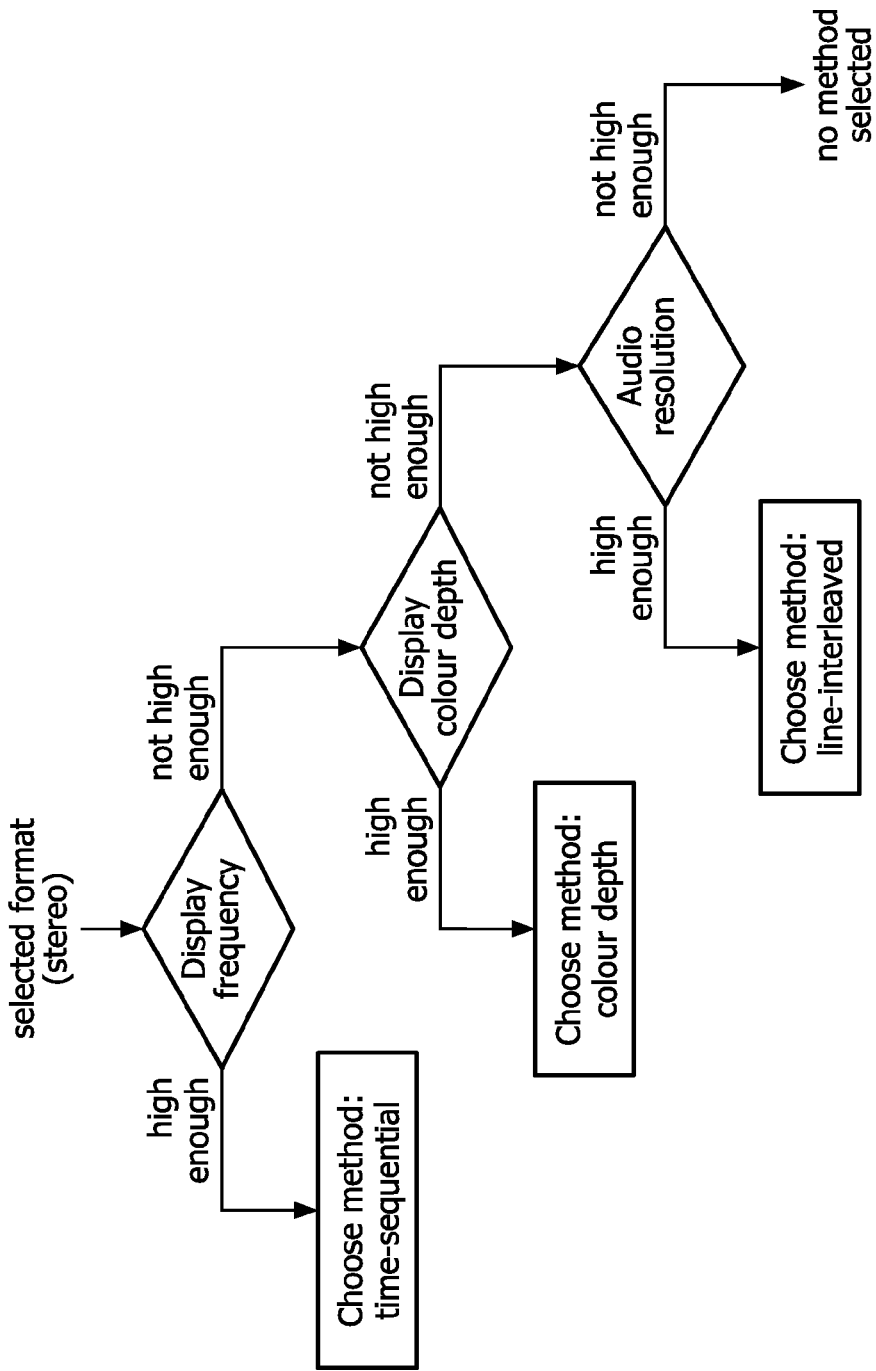
FIG. 4 illustrates how to deal with depth-based content.

FIG. 2 shows a flow chart of the algorithm explained above in words. The parts that deal with stereo and depth-based content are shown respectively in 3 and 4.

Figure 8:
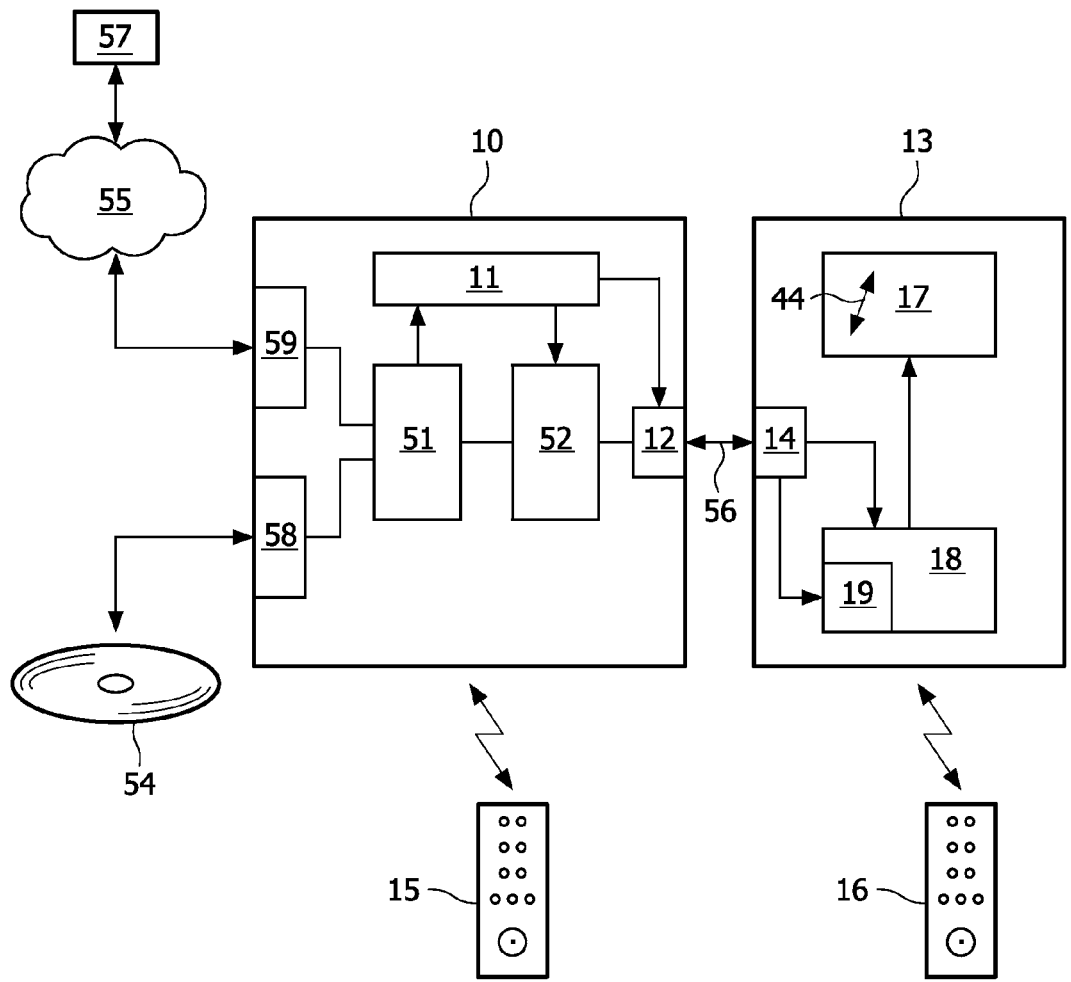

FIG. 8 shows a system for transferring three dimensional (3D) image data, such as video, graphics or other visual information. A 3D playback device 10 is coupled to a 3D display device 13 for transferring a 3D display signal 56. The 3D playback device has an input means 51 for receiving image information. For example the input means device may include an optical disc unit 58 for retrieving various types of image information from an optical record carrier 54 like a DVD or BluRay disc. Alternatively, the input means may include a network interface unit 59 for coupling to a network 55, for example the internet or a broadcast network, such device usually being called a set-top box. Image data may be retrieved from a remote media server 57. The playback device may also be a satellite receiver, or a media server directly providing the display signals, i.e. any suitable device that outputs a 3D display signal to be directly coupled to a display unit.

The 3D playback device has a processing unit 52 coupled to the input means 51 for processing the image information for generating a 3D display signal 56 to be transferred via an output interface unit 12 to the display device. The processing unit 52 is arranged for generating the image data included in the 3D display signal 56 for display on the display device 13. The playback device is provided with user control elements 15, for controlling display parameters of the image data, such as contrast or color parameter. The user control elements as such are well known, and may include a remote control unit having various buttons and/or cursor control functions to control the various functions of the 3D source device, such as playback and recording functions, and for setting said display parameters, e.g. via a graphical user interface and/or menus.

The 3D display device 13 is for displaying 3D image data. The device has an input interface unit 14 for receiving the 3D display signal 56. The display device is provided with further user control elements 16, for setting display parameters of the display, such as contrast, color or depth parameters. The transferred image data is processed in processing unit 18 according to the setting commands from the user control elements and generating display control signals for rendering the 3D image data on the 3D display based on the different frame types. The device has a 3D display 17 receiving the display control signals for displaying the processed image data, for example a dual LCD. The display device 13 is a stereoscopic display, also called 3D display, having a display depth range indicated by arrow 44. The display of 3D image data is performed in dependence of the different frames each providing a respective partial 3D image data structure.

A system comprises a displaying device adapted for displaying 3D video information coupled via an interface to a playback device. The playback device receive a compressed information stream comprising the 3D video information, processes these information and transmits a signal via the interface to the displaying device. The playback device may obtained the compressed information stream by reading the information from a storage media, or receiving it via a separate transmission systems. Exemplary embodiments of transmission systems are internet, (digital) wired and wireless broadcasting, while exemplary storage media is the Blu-Ray system.

A playback device according to the invention comprises
  input means for receiving the three dimensional video information from a record medium or via a data transmission system
  outputting means for transmitting the video information over an interface to a displaying device, the displaying device and the interface such that the properties of the displaying device can be queried over the interface,
  means for determining one or more video format in which a compressed three dimensional video information is available to the input;
  means for querying the displaying device over the interface with respect to one or more three dimensional video formats which the displaying device is able to process;
  means for selecting a best matching video format,
  wherein
the best matching video format different from at least one available video format, the selection of the best matching video format based on the available video format and the video formats which the displaying device is able to process
  video processing means for processing the compressed three dimensional video information such that the three dimensional video information is transmitted over the interface in the best matching video format.

It is noted that the means for selecting may be implanted in a control unit controlling the playback device via suitable hardware or software. In an embodiment of the invention, the control unit may be adapted to perform all steps of the method.

Figure 5:
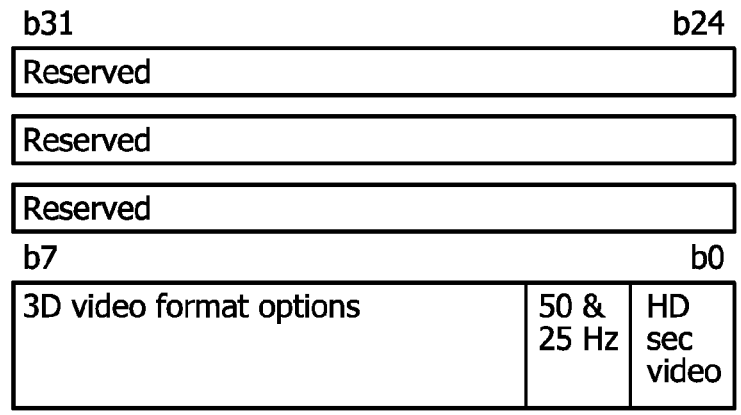
FIG. 5 illustrates how to indicate video output format.

After choosing the format and the transmission method the playback device stores in a player settings register identification information. In the particular embodiment in which the playback device is a BD player, the definition of Register 29 "Player Capability for Video" is extended. Register 29 represents the video capability of the BD-ROM layer. Currently it defines whether a player has the capability to output either 50 or 25 Hz and whether the player can decode a secondary video stream at Full HD resolution. FIG. 5 shows the extended description of register 29 of the BD spec. The first two bits of the 32 bit register are used, the other fields were reserved. These other reserved fields may be extended to indicate the types of 3D output format that is supported. Alternatively we define a new register that holds these values.

For a set top box, an additional registry as described above may be implemented.

Table 3 and already indicated several format options. Currently we believe that using the remaining 6 bits (64 options) is sufficient to indicate the many different formats that are possible.

In addition to the register, the Java application on disc requires a mechanism to read the value such that it can determine how to set the HAVi device configuration such that any graphics overlay drawn by the application is overlaid over the right parts of the video background.

FIG. 5 shows some example formats of the video background.

Figure 6:
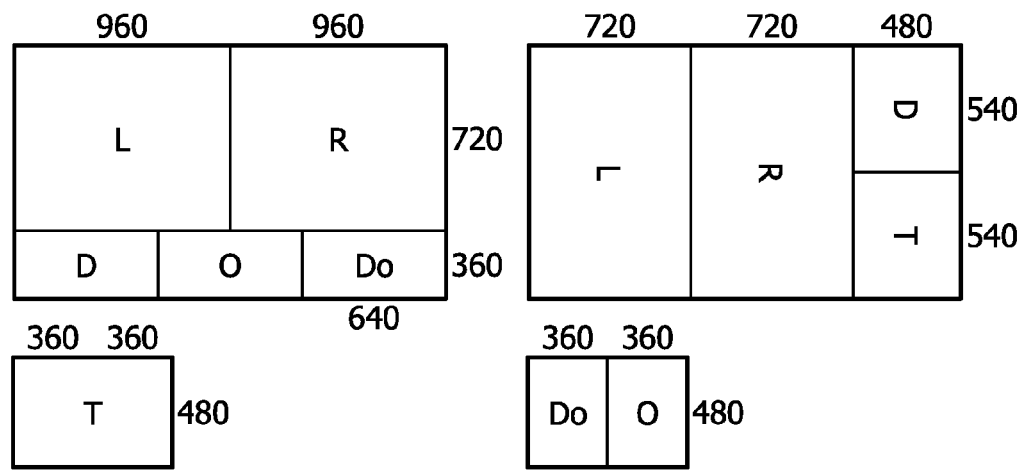
FIG. 6 illustrates schematically formats of video background.

As can be seen in FIG. 6 the configuration of the video background may vary considerably and these are only two options, many other configurations are also possible. In each of these different configurations the graphics overlay should be composited over different parts of the video background.

Figure 7:
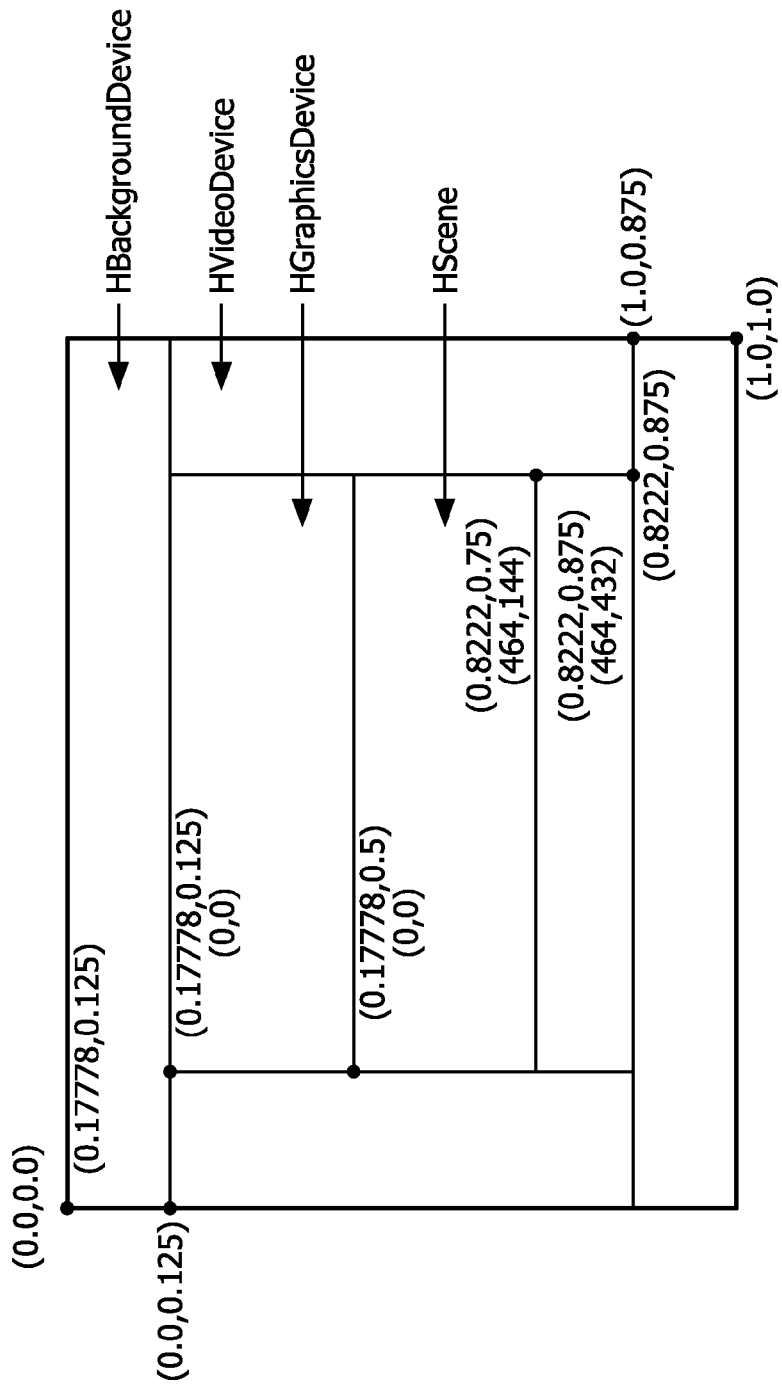
FIG. 7 illustrates a possible HAVi device configuration and
FIG. 8 describes a system wherein the invention may be practiced.

Currently the HAVi device configuration consists of a HBackground device, a HVideoDevice a HGraphicsDevice class and a HScene class. Through these classes the application can control the configuration of the background, video, graphics and application UI planes and how they are composited to form one output frame. FIG. 7 shows a possible configuration of HAVi devices.

As can be seen in FIG. 6, multiple video streams are used for 3D. The graphics overlay for output to stereo displays should overlay two identical but transposed images on different parts of the video. For output to auto-stereoscopic displays the graphics overlay should be positioned over the video containing the Left (or 2D) video and over the depth related layers (occlusion and transparency). By checking the player register setting for 3D output the application can find out on which parts of the video should overlay graphics.

Although possible this approach is cumbersome for the application author. In order to alleviate this it is required to change the HAVi device configuration mechanism in a BD-player to allow it to represent the different configurations possible for 3D video formats.

Several ways are possible. One approach is to add new classes specific for Blu-ray Disc which each represent the different video background segments, for example a BDLeftVideo, BDRightVideo, BDDepthVideo, BDOcclusionVideo etc. These classes are child classes of the HVideoDevice class. In addition corresponding Graphics overlay classes can be defined, for example BDGraphicsLeft, BDGraphicsRight, BDGraphicsDepth etc. In addition a method is required to allow the application to read the value of the register that stores the setting of the output format, for example get3DOutputConfiguration. This method returns the output format. The application can then configure the various Graphics overlay classes. This then allows the application author to write an application that overlays graphics over the different video segments without having to be aware of the exact composition used in the output format.

It should be noted that the above-mentioned embodiments are meant to illustrate rather than limit the invention. And that those skilled in the art will be able to design many alternative embodiments without departing from the scope of the appended claims. In the claims, any reference signs placed between parentheses shall not be construed as limiting the claim. Use of the verbs "comprise" and "include" and their conjugations do not exclude the presence of elements or steps other than those stated in a claim. The article "a" or an" preceding an element does not exclude the presence of a plurality of such elements. The invention may be implemented by means of hardware comprising several distinct elements and by means of a suitable programmed computer. A computer program may be stored/distributed on a suitable medium, such as optical storage or supplied together with hardware parts, but may also be distributed in other forms, such as being distributed via the Internet or wired or wireless telecommunication systems. In a system/device/apparatus claim enumerating several means, several of these means may be embodied by one and the same item of hardware or software. The mere fact that certain measures are recited in mutually different dependent claims does not indicate that a combination of these measures cannot be used to advantage.

The invention claimed is:

1. A method of transmitting three dimensional video information over an interface from a playback device to a displaying device, the method comprising:
    determining an input video format in which a compressed three dimensional video information is available to an input of the playback device, the three dimensional video information available either as stored on a record medium or received via a data transmission system;
    querying the displaying device over the interface with respect to one or more three dimensional video formats which the displaying device is able to process;
    selecting a matching video format based on the available video format and the video formats which the displaying device is able to process;
    processing the compressed three dimensional video information such that the three dimensional video information is transmitted over the interface in the matching video format, wherein the method further comprises reading a maximum horizontal and vertical frequency reachable by the displaying device when the matching video format is stereo and different from the input video format; and when the maximum horizontal and vertical frequency are high enough to accommodate resolution and frame rate of the three dimensional video information, selecting a time sequential video format as the matching video format; and when the maximum horizontal and vertical frequency are not high enough to accommodate resolution and frame rate of the three dimensional video information and when the content color depth is less than or equal to half of the maximum display color depth, selecting a color depth video format as the matching video format.

2. A method according to claim 1, wherein the processing comprises at least one of the following:
    scaling a pixel frame size of the three dimensional video information;
    adapting a frame rate of the three dimensional video information;
    adapting a color depth of the three dimensional video information.

3. A method according to claim 2, wherein the interface is a HDMI interface.

4. A method according to claim 3, wherein a stereo format is chosen as the matching video format, and the three dimensional information is chosen to be transmitted by one of the following methods:
    a time sequential method when a pixel frame size the display device is able to handle matched a pixel frame size of the available three dimensional video information;
    a line interleaving method, when a pixel frame size the display device is able to handle is at least double a pixel frame size of the available three dimensional video information.

5. A method according to claim 3, wherein a 2D+depth format is chosen as the matching video format, and depth information is accommodated in HDMI audio packets.

6. A method according to claim 1, wherein the matching video format corresponds to the highest pixel frame size and highest frame rate that the displaying device is able to process.

7. A playback device for playback of three dimensional video information, the device comprising:
    input means for receiving the three dimensional video information from a record medium or via a data transmission system;
    outputting means for transmitting the video information over an interface to a displaying device, the displaying device and the interface such that the properties of the displaying device can be queried over the interface,
    means for determining an input video format in which a compressed three dimensional video information is available to the input;
    means for querying the displaying device over the interface with respect to one or more three dimensional video formats which the displaying device is able to process;
    means for selecting a matching video format based on the available video format and the video formats which the displaying device is able to process;
    video processing means for processing the compressed three dimensional video information such that the three dimensional video information is transmitted over the interface in the matching video format, wherein the means for selecting are arranged for reading a maximum horizontal and vertical frequency reachable by the displaying device, when the matching video format is stereo and different from the input video format; and when the maximum horizontal and vertical frequency are high enough to accommodate resolution and frame rate of the three dimensional video information, selecting a time sequential video format as the matching video format; and when the maximum horizontal and vertical frequency are not high enough to accommodate resolution and frame rate of the three dimensional video information and when the content color depth is less than or equal to half of the maximum display color depth, selecting a color depth video format as the matching video format.

8. A device according to claim 7, wherein the video processing means are adapted to perform at least one of the following:
    scaling a pixel frame size of the three dimensional video information;
    adapting a frame rate of the three dimensional video information;
    adapting a color depth of the three dimensional video information.

9. A device according to claim 8, wherein the interface is a HDMI interface.

10. A device according to claim 9, wherein the means for selecting are adapted to choose a stereo format as the matching video format, and to the means for selecting are adapted to choose the three dimensional information to be transmitted by one of the following methods:
- a time sequential method when a pixel frame size the display device is able to handle matched a pixel frame size of the available three dimensional video information;
- a line interleaving method, when a pixel frame size the display device is able to handle is at least double a pixel frame size of the available three dimensional video information.

11. A device according to claim 9, wherein the means for selecting are adapted to choose a 2D+depth format as the matching video format, and device is adapted to accommodate the depth information in HDMI audio packets.

12. A device according to claim 7, wherein the matching video format corresponds to the highest pixel frame size and highest frame rate that the displaying device is able to process.

* * * * *